United States Patent
Radke et al.

(10) Patent No.: US 11,769,028 B2
(45) Date of Patent: Sep. 26, 2023

(54) COMMUNICATION DEVICE AND METHOD OF USING SUCH A COMMUNICATION DEVICE

(71) Applicant: LINXENS HOLDING, Mantes-la-Jolie (FR)

(72) Inventors: Stephan Radke, Dresden (DE); Sophie Butt, Dresden (DE)

(73) Assignee: LINXENS HOLDING, Mantes-la-Jolie (FR)

( * ) Notice: Subject to any disclaimer, the term of this patent is extended or adjusted under 35 U.S.C. 154(b) by 11 days.

(21) Appl. No.: 17/617,536

(22) PCT Filed: Jun. 12, 2019

(86) PCT No.: PCT/IB2019/000950
§ 371 (c)(1),
(2) Date: Dec. 8, 2021

(87) PCT Pub. No.: WO2020/249997
PCT Pub. Date: Dec. 17, 2020

(65) Prior Publication Data
US 2022/0245417 A1 Aug. 4, 2022

(51) Int. Cl.
*G06K 19/07* (2006.01)
*G06K 19/073* (2006.01)

(52) U.S. Cl.
CPC ..... *G06K 19/0718* (2013.01); *G06K 19/0723* (2013.01); *G06K 19/07354* (2013.01)

(58) Field of Classification Search
CPC .................................................. G06K 19/0718
(Continued)

(56) References Cited

U.S. PATENT DOCUMENTS

2007/0069010 A1 3/2007 Mestres et al.
2013/0207786 A1 8/2013 Hutzler et al.
(Continued)

FOREIGN PATENT DOCUMENTS

| CN | 108701383 A | 10/2018 |
| JP | 2010-510609 A | 4/2010 |
| WO | 2020249997 A1 | 12/2020 |

OTHER PUBLICATIONS

Office Action for related Japanese Patent Application No. 2021-572897, dated Jan. 10, 2023, 8 pages.
(Continued)

*Primary Examiner* — Rafferty D Kelly
(74) *Attorney, Agent, or Firm* — DITTHAVONG, STEINER & MLOTKOWSKI

(57) ABSTRACT

In various aspects, the present disclosure is directed to a device and method enabling communication only in case of a personal identification. In some aspects, a communication device is provided, the communication device comprising a transponder unit configured for at least one of sending data to and receiving data from another communication device, a biometric sensor unit configured to sense biometric data of a user of the communication device, and a security interface unit arranged between the transponder unit and the biometric sensor. Herein, the security interface unit is configured to enable the transponder unit for at least one of sending and receiving data upon biometric data sensed by the biometric sensor being verified as representing verified biometric data, and the transponder unit comprises a communication interface having a state machine. The state machine being enabled independently from the biometric data sensed by the biometric sensor unit being verified by the security interface as representing verified biometric data.

12 Claims, 8 Drawing Sheets

(58) Field of Classification Search
USPC .......................................................... 235/380
See application file for complete search history.

(56) References Cited

U.S. PATENT DOCUMENTS

2016/0086404 A1\* 3/2016 Parthasarathy ........ G07C 9/253
340/5.28
2017/0286748 A1 10/2017 Kim et al.

OTHER PUBLICATIONS

International Search Report and Written Opinion for related International Patent Application No. PCT/IB2019/000950, dated Feb. 7, 2020, 14 pages.
Office Action with Google Translation for related Chinese Patent Application No. 201980097387.8, dated Aug. 1, 2023, 16 pages.

\* cited by examiner

COMMUNICATION DEVICE AND METHOD OF USING SUCH A COMMUNICATION DEVICE

TECHNOLOGICAL FIELD

The present disclosure is directed to a communication device and to a method of using the communication device for at least one of sending and receiving data.

BACKGROUND

In a secret communication between at least two communication devices, encrypted information is exchanged between a sender and a recipient. The communication between the sender and the recipient is usually protected by encrypting the communication at the sender and decrypting the communication at the recipient. Conventionally, encryption is performed on the basis of at least one key that is generated by at least one of the participating communication devices. The decryption is only successful when the recipient has a valid key. In theory, the decrypted messages are only available at the end points of the communication, as long as the key(s) used for encryption and decryption are known only to sender and recipient.

This scheme of a secure communication between sender and recipient is reliable only as long as the key is not broken. Furthermore, in case that the key is lost by the sender or the recipient, a new key has to be generated and any communication between sender and recipient has to be based on the generated new key. Furthermore, at least one separate key is to be used for each communication with another communication device.

Aside from having a secure communication, it is often desirable to have a communication device protected against a third person other than the user of the communication device having access to the communication device. In this case, it may be ascertained that sensitive information stored on a communication device, such as keys or other sensitive data (e.g., data involved in bank business of a person), may not be retrieved by a third person from the communication device.

An example of a communication device is a so-called "smart card." A smart card is an electronic card having the ability to store data and to interact with a user and/or external devices, for example, via contactless technologies such as RFID. These smart cards can interact with sensors to communicate information in order to enable access, to authorize transactions, and so on.

Document US2017/0293793A1 describes a fingerprint authorizable device, including a control system for controlling the device. The control system is arranged to provide access to one or more functions of the device in response to an identification of an authorized fingerprint, a circuit board for holding electrical components of the device, and a fingerprint sensor assembly including a fingerprint sensor for obtaining fingerprint data for use in the fingerprint authorization, and a two-part enclosure for holding the fingerprint sensor. The two-part enclosure has an inner casing for attachment to the circuit board and for enclosing the fingerprint sensor, and an outer casing for retaining the fingerprint sensor within the inner casing, the outer casing being arranged to be coupled to the inner casing.

It is an object of the present disclosure to provide a communication device, which overcomes drawbacks of the state of the art as indicated above.

SUMMARY

In various aspects, the present disclosure is directed to a device and method enabling communication only in case of a personal identification.

In a first aspect, the present disclosure provides for a communication device, e.g., a smart card. In accordance with illustrative embodiments herein, the communication device comprises a transponder unit configured for at least one of sending data to and receiving data from another communication device, a biometric sensor unit configured to sense biometric data of a user of the communication device, and a security interface unit arranged between the transponder unit and the biometric sensor. Herein, the security interface unit is configured to enable the transponder unit for at least one of sending and receiving data upon biometric data sensed by the biometric sensor being verified as representing verified biometric data. A state machine of a communication interface of the transponder unit is enabled independently from the biometric data sensed by the biometric sensor unit being verified by the security interface as representing verified biometric data.

Accordingly, the operation of the communication interface is disabled until the communication device is unlocked by verified biometric data (aside from a working microcontroller of the transponder unit). It is only the transponder unit that is unlocked when the identity of a user is confirmed by means of verified biometric data.

For example, the communication device may still be operate internally, despite of the user identity not having been confirmed, therefore, allowing the device to run desired routines and/or programs, such as backup and/or security routines, in the background in a mode in which the communication device is not enabled for communication with other communication devices, that is, the state machine of the communication interface being stopped.

In some illustrative embodiments of the first aspect, the security interface unit may be implemented as a separate additional hardware with respect to the transponder unit. This allows the transponder unit to be used with various security interface units in a modular design. For example, a transponder unit may be used by different users, each user having a dedicated security interface unit.

In some further advantageous implementations herein, a biometric sensor unit may be implemented as a subunit of the security interface unit. Accordingly, a security interface unit may be associated with a dedicated user via the user's biometric data.

In accordance with other illustrative embodiments of the first aspect, the security interface unit may be implemented as a software resident on the transponder unit. Accordingly, the transponder unit may be associated with a dedicated user.

In accordance with some illustrative embodiments of the first aspect, the biometric sensor unit may be configured to sense at least one of a fingerprint, an iris pattern, a hand shape, hand vein patterns and movement patterns. These patterns may represent advantageous realizations of biometric data.

In accordance with some illustrative embodiments of the first aspect, the transponder unit may be automatically disabled once a certain time interval has elapsed since the security interface unit verified biometric data as representing verified biometric data. This allows the communication device to enter a secured mode after a given time period without the user having to actively operate the communication device to enter a secure mode.

In accordance with some illustrative embodiments of the present disclosure, the security interface unit may be configured to compare sensed biometric data with verified biometric data stored in the memory of the communication device and to issue an enabling signal to the communication interface of the transponder unit for enabling at least one of a sending-data-to and receiving-data-from the other communication device by enabling the state machine of the communication interface. Accordingly, upon the security interface unit verifying biometric data of a user, an activation signal is output to the communication interface of the transponder unit, thereby enabling the transponder unit to send data and/or receive data.

In accordance with some advantageous implementations herein, the enabling signal comprises a valid identification signal. Herein, a microcontroller of the transponder unit is configured to compare the valid identification signal with a plurality of verified valid identification signals and to output an activation signal to the communication interface on the basis of the enabling signal in case of encountering a match of the valid identification signal with a verified valid identification signal. Accordingly, the microcontroller may represent a further security gate prior to enabling the communication device to enter into communication with other devices upon the security interface verifying biometric data of a user.

In a second aspect of the present disclosure, a method of using the communication device of the first aspect for at least one of sending and receiving data is provided. In accordance with some illustrative embodiments of the second aspect, the method comprises sensing biometric data of a user of the communication device by the biometric sensors, enabling the transponder unit of the communication device for at least one of receiving and sending data upon the sensed biometric data being verified as representing verified biometric data, and enabling the state machine of the communication interface of the transponder unit is enabled independently from the biometric data sensed by the biometric sensor being verified as representing verified biometric data.

In some illustrative embodiments of the second aspect, the method may further comprise disabling the state machine of the transponder unit of the communication device once a certain time interval has elapsed since the security interface unit verified biometric data as representing verified biometric data.

In accordance with some illustrative embodiments of the second aspect, the verifying of biometric data by the security interface unit may further comprise comparing sensed biometric data with verified biometric data stored in the memory of the communication device, and issuing an enabling signal to the state machine of the communication interface of the transponder unit for enabling at least one of a sending data to and receiving data from the other communication device.

In accordance with some advantageous realizations herein, the enabling signal may comprise a valid identification signal. Herein, a microcontroller of the transponder unit may compare the valid identification signal with a plurality of verified valid identification signals and may output the enabling signal in the case of encountering a match of the valid identification signal with a verified valid identification signal.

In accordance with some illustrative embodiments of the second aspect, the sensing of biometric data of a user of the communication device by the biometric sensor may comprise sensing at least one of a fingerprint, an iris pattern, a hand shape, a hand vein pattern and movement patterns.

In accordance with some illustrative embodiments of the present disclosure, the sensing of biometric data of a user of the communication device by the biometric sensor may comprise sensing first biometric data and second biometric data. Furthermore, the transponder unit of the communication device may be enabled for at least one of receiving and sending data upon the sensed first biometric data being verified as representing first verified biometric data and the sensed second biometric data being verified as representing second verified biometric data, the first and second verified biometric data being stored in at least one of the security interface unit and the microcontroller. Accordingly, the communication device may be secured by at least two types of biometric data.

In accordance with an advantageous realization herein, at least one additional verified biometric data obtained by sensing at least one of a fingerprint, an iris pattern, a hand shape, hand vein patterns and movement patterns may be added to the first and second verified biometric data upon the security interface unit verifying at least one of the sensed first biometric data as representing first verified biometric data and the sensed second biometric data as representing second verified biometric data. Accordingly, the biometric data employed for enabling the device to enter into communication with other communication devices may be extended or increased by adding another type of biometric data to be sensed.

BRIEF DESCRIPTION OF THE DRAWINGS

The above-described illustrative embodiments and aspects of the present disclosure will be described in greater detail with regard to the accompanying drawings in the detailed description below, wherein.

Figure 1:
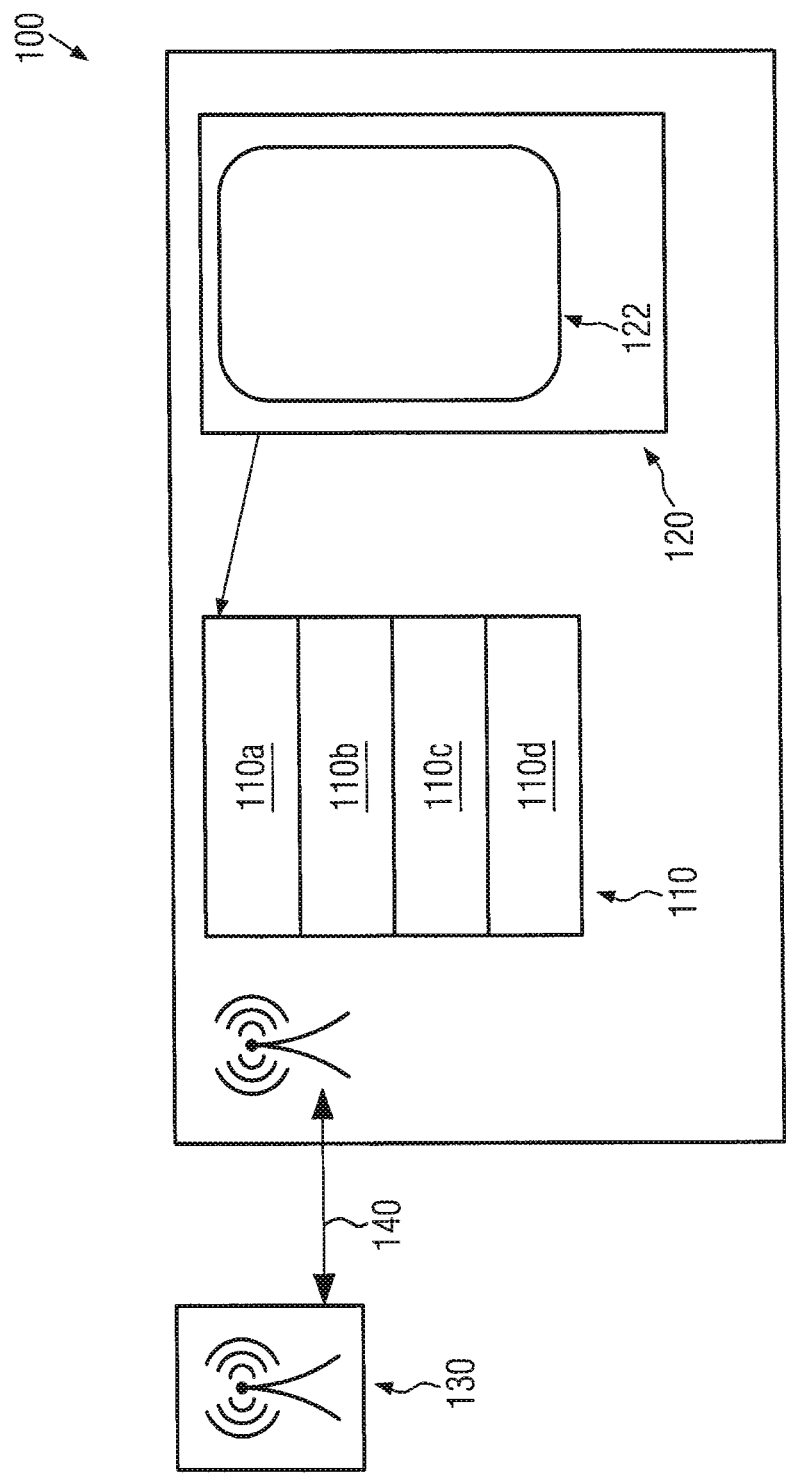
FIG. 1 schematically illustrates a communication device in accordance with some illustrative embodiments of the present disclosure.

While the subject matter disclosed herein is susceptible to various modifications and alternative forms, specific embodiments thereof have been shown by way of example in the drawings and are herein described in detail.

It should be understood, however, that the description of specific embodiments herein is not intended to limit the invention to the particular forms disclosed, but, to the contrary, the intention is to cover all modifications, equivalents, and alternatives falling within the spirit and scope of the invention as defined by the appended claims.

It should be understood that the figures are not intended to illustrate features and elements with regard to a specific scale, unless a specific scale is specifically shown in the figures.

DETAILED DESCRIPTION

In the following, various illustrative embodiments and examples of the first and second aspects described above will be explained with regard to FIGS. 1 to 8.

FIG. 1 shows a communication device 100 having a transponder 110 and a security interface 120. The communication device 100 may be in communication with a communication infrastructure 130, as illustrated by a double-sided arrow 140 in FIG. 1. The double-sided arrow 140 in FIG. 1 is also indicated as a wireless communication, which poses no limitation to the present disclosure, and a wired or direct contact connection between the communication device 100 and the communication infrastructure 130 may be realized.

In accordance with some illustrative embodiments of the present disclosure, the communication device may be a smart card, a cellular phone, a smart phone or any other electronic communication device. With regard to smart cards, the person skilled in the art will appreciate that a smart card is an illustrative example of a pocket-sized, low cost, portable electronic device. Smart cards are typically in the shape of a conventional wallet-sized thin rectangular credit card and may contain active electronic components. In some illustrative applications, smart cards may be used for financial transactions, such as purchasing products and services, or depositing or retrieving money from financial institutions. Accordingly, the incentive for unscrupulous users to illegitimately acquire and falsify smart cards is, thus, quite high, and methods and systems to ensure smart card security are quite desirable.

In accordance with some illustrative embodiments of the present disclosure, the transponder 110 may comprise a communication interface 110a, such as an RFID unit, a power source 110b, a microprocessor 110c and an electrical connector 110d for electrically coupling the communication device 100 with the communication infrastructure 130, e.g., via a USB connector or the like, among other components.

In accordance with some illustrative embodiments of the present disclosure, the security interface 120 is coupled to a biometric sensor unit 122 configured to sense biometric data of a user of the communication device 100. In accordance with some illustrative examples herein, the security interface unit 120 may be implemented as a separate additional hardware with respect to the transponder unit 110 and the biometric sensor unit 122 may be implemented as a subunit of the security interface unit. Alternatively, the security interface unit 120 may be implemented as a software resident on the transponder unit 110, although the transponder unit 110 and the security interface 120 are depicted in FIG. 1 as separate entities.

In accordance with some illustrative embodiments of the present disclosure, the biometric sensor unit 122 is configured to sense at least one of a fingerprint, an iris pattern, a hand shape, hand vein patterns and movement patterns of a user.

Still referring to FIG. 1, the security interface unit 120 may be configured to compare biometric data sensed by the biometric sensor unit 122 with verified biometric data stored in a memory (not illustrated) of the communication device 100. For example, the memory (not illustrated) may be implemented as a separate element of the communication device 100 or may be part of the transponder unit 110 or the security interface 120. Furthermore, the security interface unit 120 may be configured to issue an enabling signal to the transponder unit 110.

In accordance with some illustrative embodiment, the security interface 120 may issue an enabling signal to the microcontroller 110c and the microcontroller 110c may be configured to output an enabling signal to the communication interface 110a of the transponder unit 110 for enabling at least one of a sending-data-to and receiving-data-from the communication infrastructure 130 (e.g., another communication device (not illustrated) present in the communication infrastructure or coupled to the communication infrastructure 130).

In accordance with some illustrative examples herein, the enabling signal may comprise a valid identification signal and the microcontroller 110c may be configured to compare the valid identification signal with a plurality of verified valid identification signals. Furthermore, the microcontroller 110c may be configured to output the activation signal in case of encountering a match of the valid identification signal with a verified valid identification signal to which the microcontroller 110c has access, e.g., a verified valid identification signal pre-stored in the memory (not illustrated) of the communication device 100.

Referring to FIG. 1 of the present disclosure, the security interface unit 120 is configured to enable the transponder unit 110 for at least one of sending and receiving data upon biometric data sensed by the biometric sensor unit 122 being verified as representing verified biometric data.

In accordance with some illustrative embodiments of the present disclosure, the transponder unit 110 is powered independently from the biometric data sensed by the biometric sensor unit 122 being verified by the security interface unit 120 as representing verified biometric data. Accordingly, the operation of the microcontroller 110c of the communication device 100 does not depend on whether the biometric data sensed by the biometric sensor unit 122 is verified as verified biometric data and the communication device 100 is unlocked for operation by a user.

In accordance with some illustrative embodiments of the present disclosure, the transponder unit 110 may be configured for being automatically disabled once a certain time of interval has elapsed since the security interface unit 120 had verified biometric data as representing verified biometric data. For example, a state machine of the communication interface 110a may be enabled upon receipt of the enabling signal such that the state machine is enabled upon biometric data sensed by the biometric sensor unit 122 being verified as representing verified biometric data. Accordingly, the operation of the communication interface 110a is disabled until the communication device 100 is unlocked by verified biometric data (aside from the microcontroller 110c of the transponder unit 110 being in a working condition). In other words, it is only the transponder unit 110 that is unlocked when the identity of a user is confirmed by means of verified biometric data.

In the context of the present application, a "state" is a description of the status of a system, such as the transponder unit 110, that is waiting to execute a transition, where a "transition" represents a set of actions to be executed when a condition is fulfilled or when an event is received. For example, when using the communication device 100 to receive and/or send messages (the communication device 100 may be considered as being in a "receiving and/or sending" state), receiving and/or sending a "message" stimulus may result in sending and/or receiving a message. When the communication device 100 is in a "disabled" state, the "message" stimulus may result in no communication of the communication device 100. Thus, identical stimuli may trigger different actions depending on the current state of the communication device 100. In accordance with some examples, the state machine may be implemented by hardware (e.g., a digital circuit built using a programmable logic device, a programmable logic controller, logic gates and flip flops or relays, where a hardware implementation may require a register to store state variables, a block of combinational logic that determines the state transition, and a second block of combinational logic that determines the output of the state machine) or by software.

Figure 2:
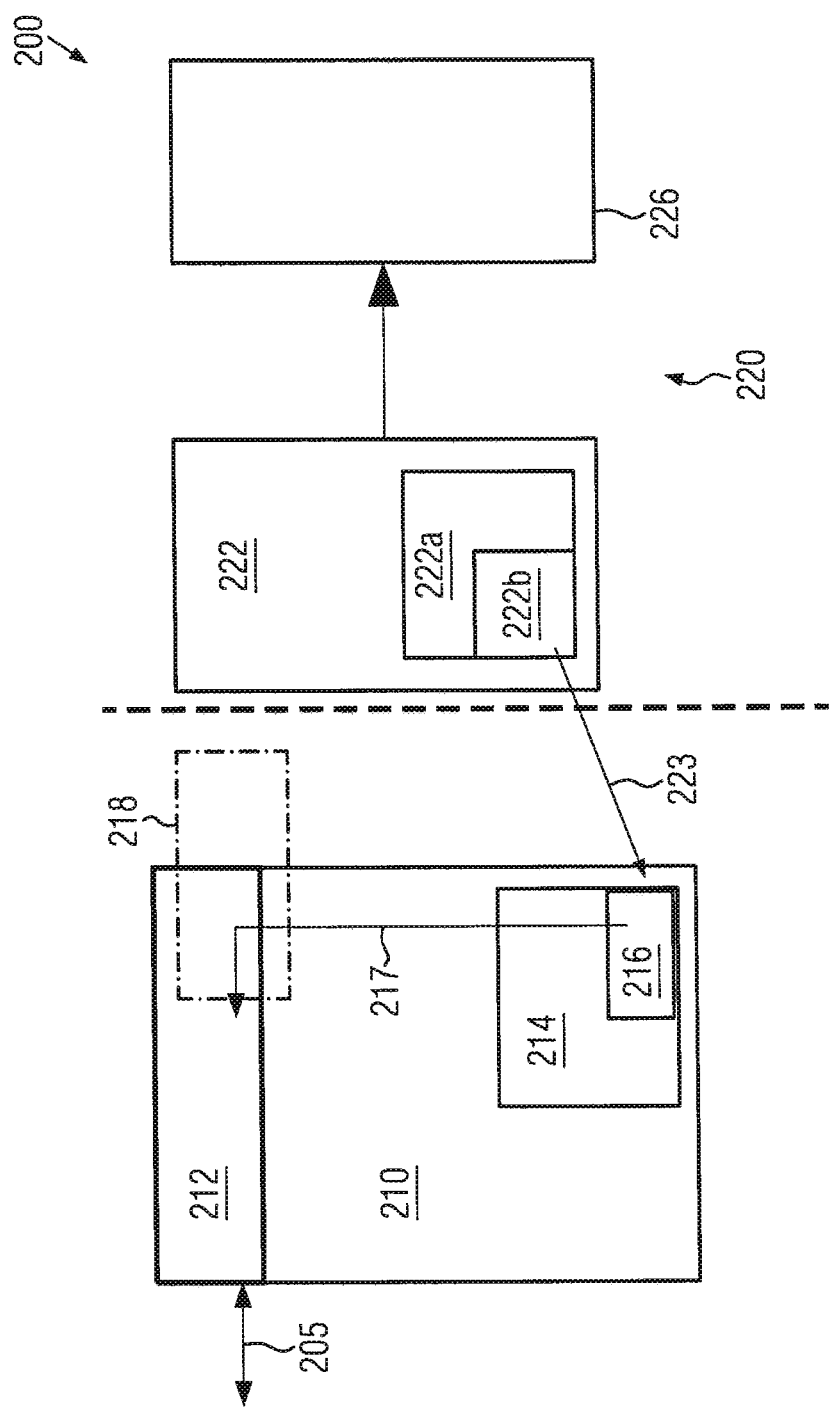
FIG. 2 schematically illustrates a communication device in accordance with some illustrative embodiments of the present disclosure.

Referring to FIG. 2 of the present disclosure, a communication device 200 is schematically illustrated. In accordance with some illustrative embodiments, the communication device 200 may be a smartcard.

According to some illustrative embodiments, the communication device 200 comprises a transponder unit 210 configured for at least one of sending data to and receiving data from a communication infrastructure (not illustrated), such as another communication device (not illustrated). A communication 205 with the communication infrastructure (not illustrated) may be established via an communication interface 212, e.g., an RFID unit, of the transponder unit 210 and/or via a wired connection by means of a communication connector (not illustrated), such as an USB connection and the like. The transponder unit 210 may comprise a microcontroller 214, which may be configured to execute a software 216. The software 216 may generate a signal 217 output to an operating system 218 of the communication interface 212 for enabling the communication interface 212 for at least one of sending and receiving data upon receipt of the signal 217.

In accordance with some illustrative embodiments of the present disclosure and as illustrated in FIG. 2 of the present disclosure, the communication device 200 further comprises a security interface unit 220. The security interface unit 220 may be implemented as a separate additional hardware with respect to the transponder unit 210, as is indicated in FIG. 2 by a broken line. The security interface unit 220 and the transponder unit 210 may be integrated into the communication device 200 in a way that the security interface unit 220 is mechanically and electrically separable from the transponder unit 210. Alternatively, the security interface unit 220 and the transponder unit 210 may be mechanically and electrically coupled in a way that a mechanical and electrical separation of the security interface unit 220 from the transponder unit 210 damages the communication device 200.

The security interface 220 comprises a microprocessor unit 222 with a microcontroller 222a which is configured to perform a software 222b. The software 222b is configured to generate a signal 223, which is output to the microcontroller 214 of the transponder unit 210.

With reference to FIG. 2, the security interface unit 220 further comprises a biometric sensor unit 226 which is configured to sense biometric data of a user of the communication device 200 and which is coupled to the microprocessor unit 222 of the security interface 220 via a communication line 224, such as a bus system.

In accordance with some illustrative embodiments of the present disclosure, the microcontroller 214 of the transponder unit 210 is powered independently from any signal 223 output by the security interface unit 220. However, the generation of the signal 217 output to the operating system 218 of the communication interface 212 depends only on the signal 223 representing a valid signal.

In accordance with some illustrative embodiments of the present disclosure, the biometric sensor unit 226 is configured to sense at least one of a fingerprint, an iris pattern, a hand shape, hand vein patterns and movement patterns.

Referring to FIG. 2 of the present disclosure, the security interface unit 220 is configured to compare biometric data sensed by the biometric sensor unit 226 with verified biometric data stored in a memory of the microprocessor unit 222. Upon a match of the sensed biometric data with verified biometric data, the security interface unit 220 is configured to issue an enabling signal 223 to the microcontroller 214 of the transponder unit 210. In turn, the microcontroller 214 of the transponder unit 210 is configured to output an activation signal 217 to a communication interface of the transponder unit 210, that is, the RFID unit 212 in the embodiment illustrated in FIG. 2 of the present disclosure, for enabling at least one of sending-data-to and receiving-data-from a communication infrastructure (not illustrated) as indicated by a double arrow 205 in FIG. 2 of the present disclosure.

In accordance with some illustrative examples herein, the enabling signal 223 may comprise a valid identification signal. The microcontroller 214 of the transponder unit 210 may be configured to compare the valid identification signal with a plurality of verified valid identification signals and to output the activation signal 217 in case of encountering a match of the valid identification signal with a verified valid identification signal. Accordingly, a second step of verification may be provided in order to increase the security of the communication device 200.

Figure 3:
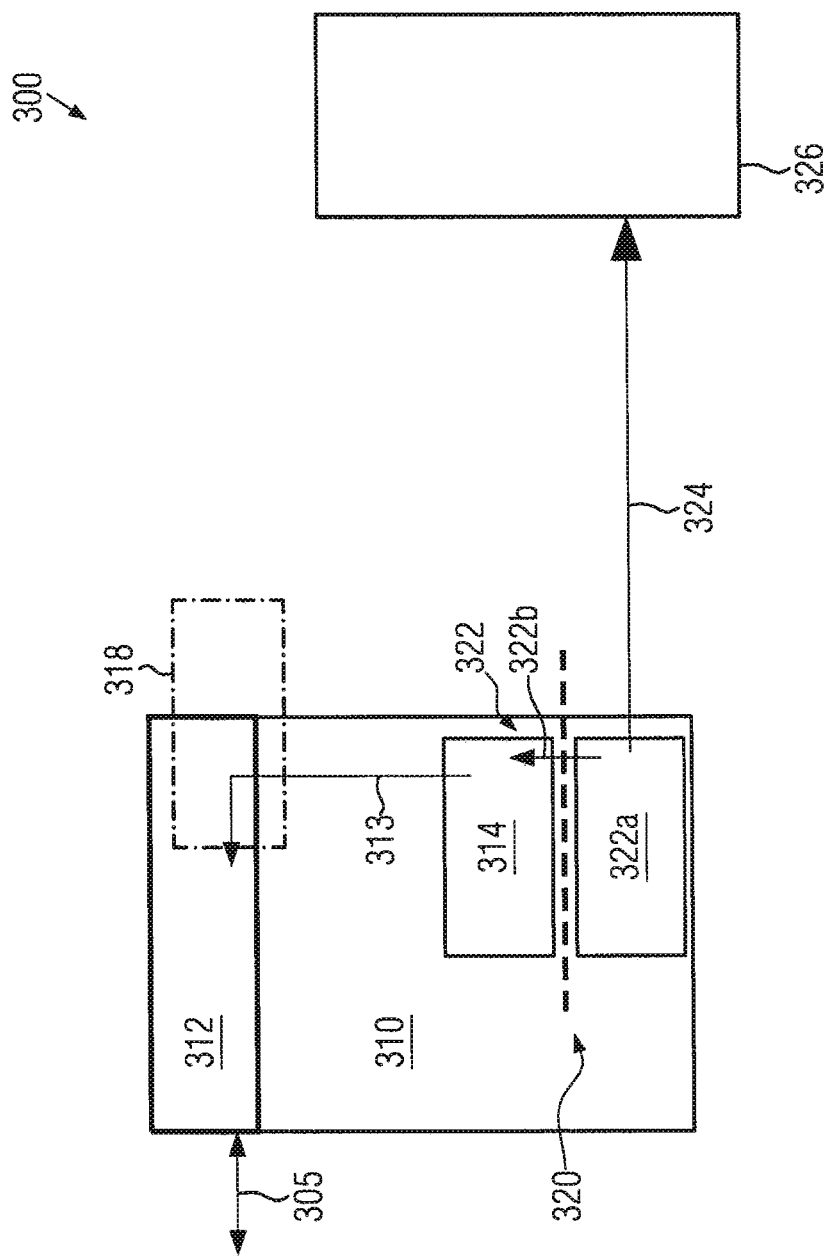
FIG. 3 schematically illustrates a communication device in accordance with other illustrative embodiments of the present disclosure.

Referring to FIG. 3 of the present disclosure, a communication device 300 in accordance with some other illustrative embodiments of the present disclosure will be described. The communication device 300 illustrated in FIG. 3 of the present disclosure differs from the communication device 200 shown in FIG. 2 of the present disclosure in that a transponder unit 310 comprises a communication interface 312 and a security interface unit 320. The security interface unit 320 comprises a microcontroller 322 being configured to execute a software 322a generating an identification signal 322b which is forwarded to a second software 314 executed by the microcontroller 322 and being able to generate a valid identification signal upon verifying the identification signal 322b. The microcontroller 322 is further configured to output an activation signal 313 to the communication interface 312 of the transponder unit 310, that is, the activation signal 313 is output to an operating system 318 of the communication interface 312. Upon the communication interface 312 receiving the activation signal, the communication interface 312 is enabled for at least one of sending-data-to and receiving-data-from a communication infrastructure (not illustrated) as indicated by a double arrow 305 in FIG. 3 of the present disclosure.

In accordance with some illustrative embodiments herein, the transponder unit 310 is coupled to a biometric sensor unit 326 which is configured to sense biometric data of a user of the communication device 300. The biometric sensor unit 326 may be implemented in accordance with the biometric sensor unit 226 as described above with regard to FIG. 2 and the biometric sensor array 122 as described above with regard to FIG. 1. Accordingly, the disclosure of the biometric sensor unit 122 and the biometric sensor unit 226 is included herein by reference. In accordance with an illustrative example herein, the transponder unit 210 and the biometric sensor unit 260 may be coupled by a bus system 324.

Figure 4:
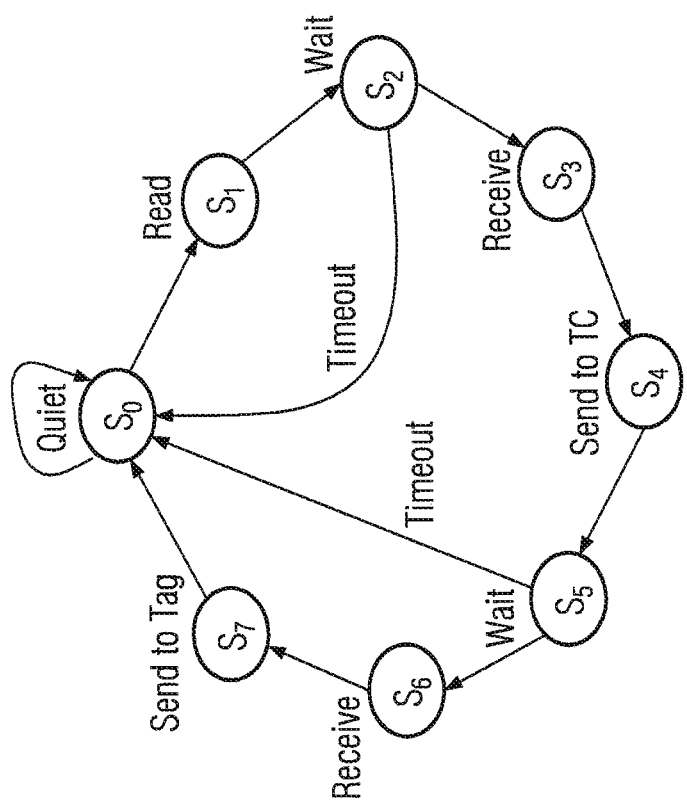
FIG. 4 represents a diagram which schematically illustrates a process of enabling communication in accordance with some aspects of the present disclosure.

Referring to FIG. 4 of the present disclosure, a principle of enabling communication between a communication device (e.g., at least one of the communication devices 100, 200 and 300 as described above with regard to FIGS. 1, 2 and 3) will be described.

As illustrated in FIG. 4 of the present disclosure, the internal state machine of a transponder unit (e.g., at least one of the transponder units 110 and 210) of the communication device is disabled or not "clocked," meaning that it remains in a state $S_0$ ("quiet"). In this state the tag remains in a dormant state (also referred to as "idle mode") in which it does not require any energy to remain in this state.

Upon receipt of a first signal, the internal state machine is in a state $S_1$ in which the received signal (e.g., tag) is read. Alternatively, the internal state machine of the communication device may send a signal, such as a signal "hello" to a communication infrastructure, such as a tag present in the communication infrastructure, in state $S_1$.

In state $S_2$, the internal state machine changes either into the state $S_0$ in case that the internal state machine has been in the state $S_1$ for a given time period, e.g., 10 seconds, 20 seconds or any other time period predetermined or specified by a user, or enters a state $S_3$ upon receipt of a response from the communication infrastructure. The tag is preferably unique and cannot be related to previous transmissions. The tag also does not contain sensitive data to ensure privacy.

In state $S_4$, once the tag receives a response, it moves into a "tag verification" state to verify the values from the reader.

In state $S_5$, the tag is verified and the reader is accepted in state $S_6$, otherwise the system returns to state $S_0$. For example, the tag computes a value and compares it with a value it received from the reader. If the values are equal then the reader is authenticated and if the values do not match the reader is recognized as a rogue reader. Thus, even if the reader is rogue, no sensitive information specific to the tag is revealed during the transmissions and the tag returns to its initial state $S_0$ without changing the internal state of its variables.

At state $S_7$, that is, once the response from the reader is verified, the tag accepts the reader as being valid and updates its internal state. By moving from state $S_6$ to state $S_7$, that is, the next available node in the tree of sequence illustrated in FIG. 4 which is the last valid state of the tag. Once the reader is authenticated and a valid read confirmed, the tag goes into state $S_0$, ready to be read again.

In general, at least a microcontroller of the communication device processing biometric data needs to operate in order to validate or refuse the biometric data. With the microcontroller the decision is made to enable or disable the communication between a reader and the communication device. When referring to FIG. 3 in the context of FIG. 4, a second microcontroller may be required in case that the microprocessor of a very economically designed communication device has not the computational power to validate the biometric data.

In the present application, it is not intended to disable the microprocessor of the communication device, rather to stop the state machine of the communication layer, which may be implemented by a state machine in an independent hardware unit besides the microcontroller. An example of this state-machine is illustrated in FIG. 4 where there is no transition in the state machine when there is no clock/trigger impulse or the state machine is disabled (so, no enabling signal is set). Hence, no communication is exchanged between a reader and the communication device. The state machine may be enabled by clocking it or by enabling it, e.g., by setting the enabling signal through "power gates". FIG. 4 has only illustrative character and the "no exhaustive" state machine illustrated in FIG. 4 can be clocked or enabled and otherwise stays in one state. There is no communication in case of not being clocked or enabled.

Figure 5:
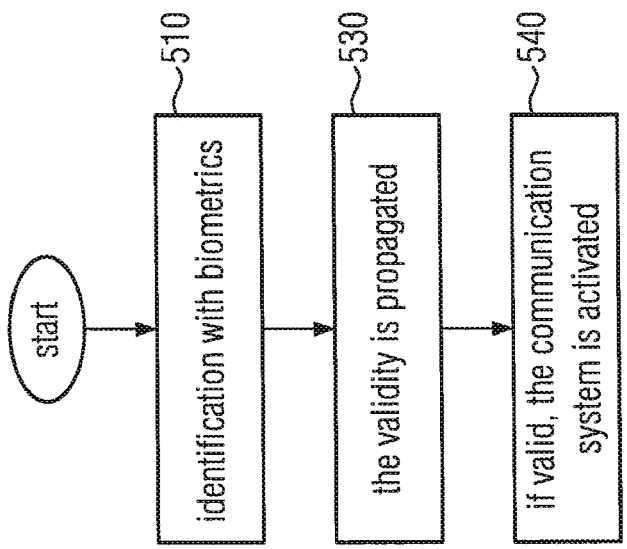
FIG. 5 schematically illustrates a flow chart of a communication device in accordance with some illustrative embodiments of the present disclosure.

Referring to FIG. 5 of the present disclosure, a flow chart of a general function of a communication device, e.g., at least one of the communication devices 100, 200 and 300 as described above with regard to FIGS. 1 to 3, is illustrated. At item 510, biometrics of a user of a communication device are identified.

At item 530, the validity of the identified biometrics is propagated in the communication device.

At item 540, the communication interface of the communication device is activated in case that the validity is received at the communication interface.

Figure 6:
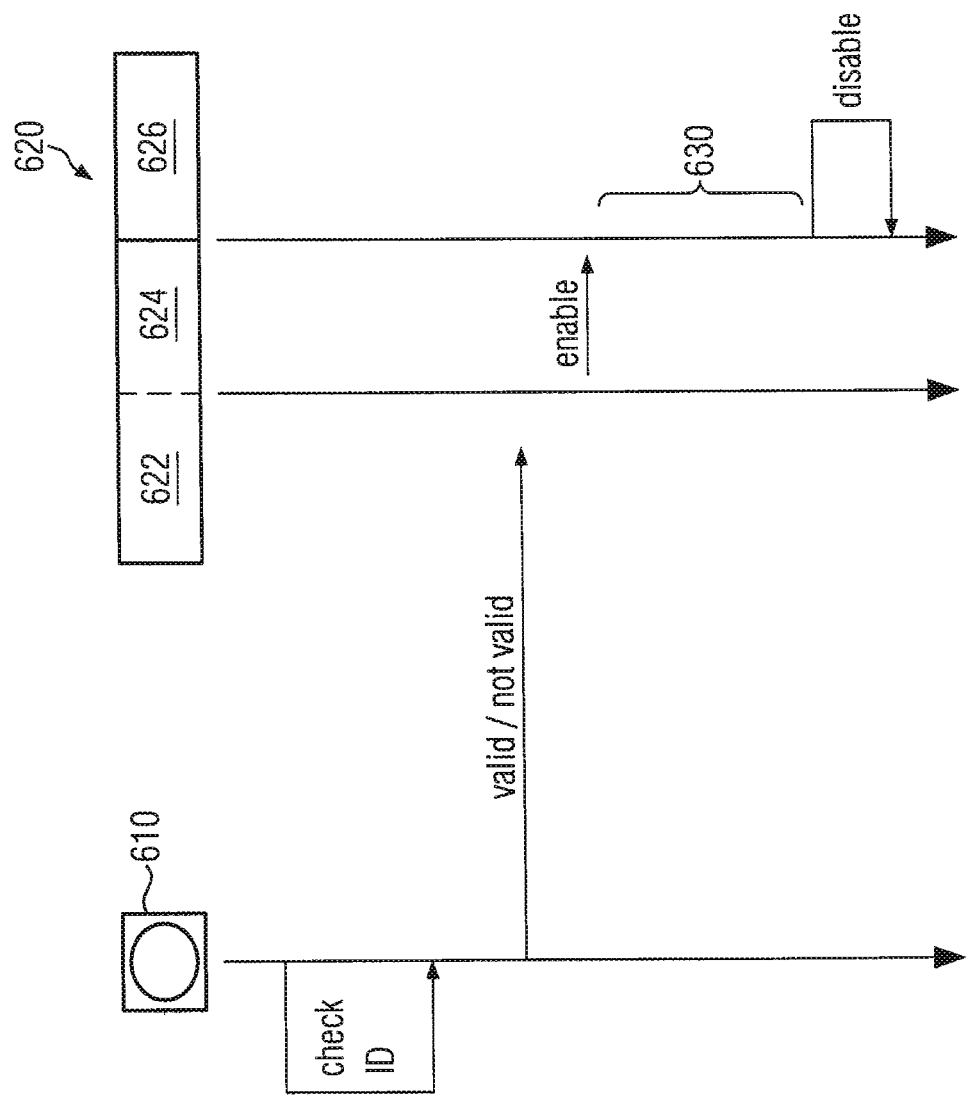
FIG. 6 schematically illustrates a sequence diagram of the communication device in accordance with some illustrative embodiments of the present disclosure.

Referring to FIG. 6 of the present disclosure, a sequence diagram of the general function of a communication device is illustrated.

A biometric sensor unit 610 senses biometric data of a user of a communication device. The sensed biometric data of the user is checked with regard to its identity. The result of the identity check is propagated to a transponder unit 620. In case of a valid identity, a microprocessor 622 of the transponder unit 620 outputs an enabling signal to an operating system 624 of the transponder unit 620, enabling a communication interface 626 of the transponder unit 620 for at least one of sending and receiving data. After a configurable time period 630, the communication interface 626 is disabled.

Figure 7:
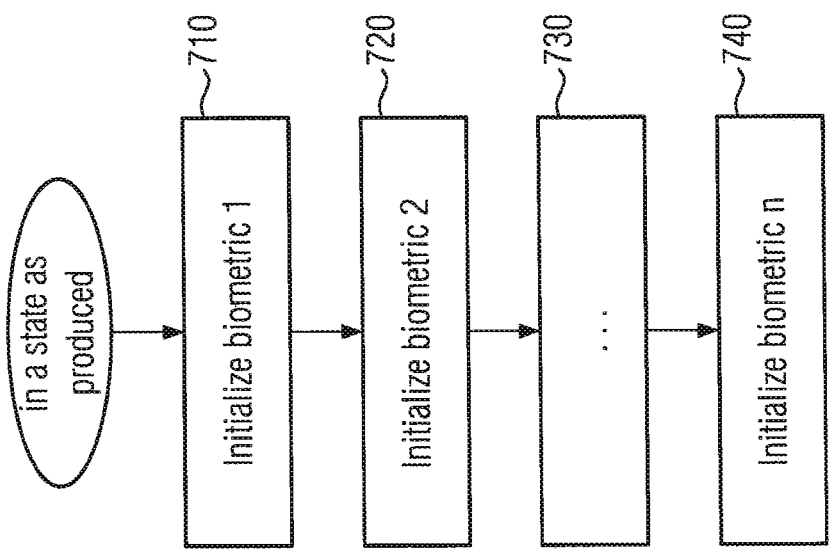
FIG. 7 schematically illustrates a flow diagram of a method of using a communication device in accordance with some illustrative embodiments of the present disclosure.

Referring to FIG. 7 of the present disclosure, a process flow in accordance with some illustrative embodiments of the present disclosure is illustrated. The process flow illustrated in FIG. 7 starts in a state of a communication device as produced. At item 710, biometric data 1 are initialized. At item 720, biometric data 2 are initialized. At item 730, an arbitrary number of biometric data is initialized. At item 740, biometric data n are initialized. The number n of biometric data denotes an integer $>1 (n \geq 1)$. According to illustrative examples herein, the sensing of biometric data of a user of a communication device by a biometric sensor may comprise sensing first biometric data ("biometric data 1") and at least second biometric data ("biometric data 2") to nth biometric data ("biometric data n"). The transponder unit of the communication device may be enabled and at least one of receiving and sending data may be performed upon the sensed first biometric data ("biometric data 1") being verified as representing verified first biometric data ("verified biometric data 1") and at least one of the sensed second biometric data ("biometric data 2") to nth biometric data ("biometric data n") being verified as representing respective verified second to nth biometric data. Herein, the first biometric data to nth biometric data are stored in at least one of a security interface unit and a microcontroller of the communication device.

Figure 8:
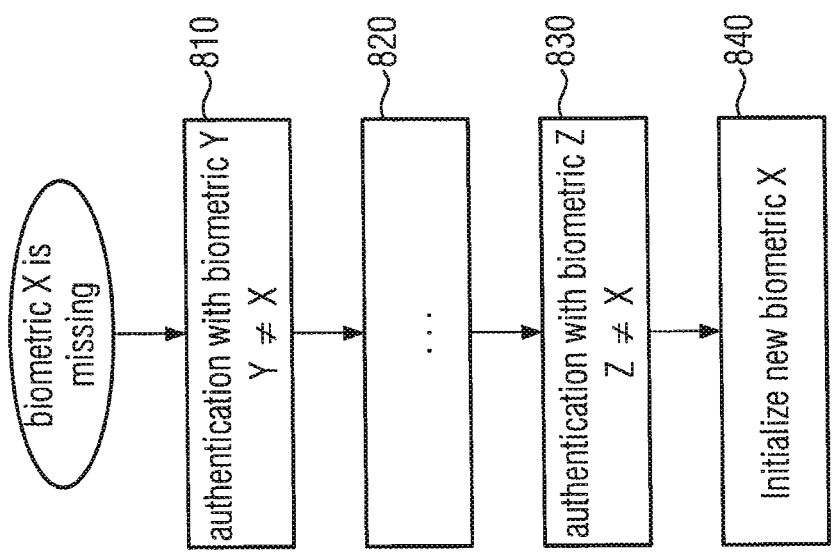
FIG. 8 schematically illustrates a flow diagram in accordance with some illustrative embodiments of the present disclosure.

Referring to FIG. 8 of the present disclosure, a process flow in accordance with some illustrative embodiments of the present disclosure is depicted. The process flow starts in a state in which the user wishes to add biometric data X. Accordingly, biometric data X is missing in a communication device.

At item 810, an authentication with regard to biometric data Y ($Y \neq X$) is performed. According to illustrative examples herein, a biometric sensor unit senses biometric data corresponding to biometric data Y.

At item 820, an arbitrary number of authentications with biometric data may be performed.

At item 830, an authentication with biometric data Z is performed (Z≠X).

Upon verifying that at least one of the biometric data Y and Z each represent respective verified biometric data, a new biometric data X is sensed by the biometric data sensor and the biometric data X is stored in at least one of the security interface units and the microcontroller of the communication device. Accordingly, the amount of biometric data, that is, the biometric data Y and Z necessary for enabling a communication device for at least one of sending and receiving data, may be extended to include new biometric data X. Accordingly, the level of security of a communication device may be increased.

In accordance with some illustrative embodiments of the present disclosure, the biometric sensor unit may include a fingerprint sensor, an iris scanner, a hand shape scanner, a hand vein pattern sensor and at least one movement pattern sensor. Regarding a movement pattern, a movement pattern may be associated with a certain movement of a fingertip on a touch screen.

In accordance with some illustrative embodiments of the present disclosure, the biometric sensor unit may comprise a processor (not illustrated) which may construct an image of a fingerprint or an image of an iris pattern or an image of a hand shape or an image of hand vein patterns or an image of movement patterns and output the image data to the security interface unit. Alternatively, the processor of the security interface unit may be configured to perform image construction of fingerprint data, iris pattern data, hand shape data, hand vein pattern data, and movement pattern data sensed by the biometric sensor unit.

A communication device in accordance with some illustrative embodiments of the present disclosure provides a security interface between a transponder unit and a biometric sensor unit. The security interface unit may be implemented either in software or in hardware.

In accordance with some illustrative embodiments of the present disclosure, a communication interface of a communication device may be disabled, but a microcontroller of a transponder unit of the communication device may still be running since the transponder is still powered with energy from a power source.

In summary, a communication device in accordance with the present disclosure enables a communication only in case of a personal identification. Herein, the operation of a communication interface, e.g., radio transmission or any other communication system of the communication device, to a communication structure is disabled by disabling sending or receiving of signals by a security interface. The person skilled in the art will appreciate that a transponder unit as described above with regard to various illustrative embodiments of the present disclosure may further include a cryptographic unit, a power unit, a memory and/or other functions. The other separated units of a transponder unit may be interrupted as well, but may also possibly continue operation while the communication unit is intermitted. Upon a user identification being verified by verifying biometric data of the user, an algorithm executed by a microcontroller of a communication device activates a communication interface. After the identity of a user is verified, encrypted messages may be sent and received by the communication device. Herein, the encryption may be performed by using biometric data of the user.

In summary, the present disclosure allows to use a flexible interface to support different biometric identification systems. A biometric sensor unit may be implemented to identify a person, which may contain iris scanners, movement pattern recognition and/or hand shape validation systems. In the present disclosure, a communication infrastructure having two or more communication devices operated in parallel may be employed.

What is claimed is:

1. A communication device, comprising:
    a transponder unit configured for at least one of sending data to and receiving data from another communication device;
    a biometric sensor unit configured to sense biometric data of a user of the communication device; and
        a security interface unit coupled to the transponder unit and the biometric sensor, wherein the security interface unit is configured to enable the transponder unit for at least one of sending and receiving data upon biometric data sensed by the biometric sensor unit being verified as representing verified biometric data, and
    wherein the transponder unit comprises a microcontroller and a communication interface which is disabled until the communication device is unlocked by the biometric data sensed by the biometric sensor unit being verified by the security interface unit as representing verified biometric data,
    wherein the security interface unit is configured to compare sensed biometric data with verified biometric data stored in a memory of the communication device and to issue an enabling signal to the communication interface of the transponder unit for enabling at least one of sending data to and receiving data from the other communication device, and
    wherein the enabling signal comprises a valid identification signal, the microcontroller being configured to compare the valid identification signal with a plurality of verified valid identification signals and to output an activation signal to the communication interface on the basis of the enabling signal in case of encountering a match of the valid identification signal with a verified valid identification signal.

2. The communication device of claim 1, wherein the security interface unit is implemented as a separate additional hardware with respect to the transponder unit.

3. The communication device of claim 2, wherein the biometric sensor unit is implemented as a subunit of the security interface unit.

4. The communication device of claim 1, wherein the security interface unit is implemented as a software resident on the transponder unit.

5. The communication device of claim 1, wherein the biometric sensor unit is configured to sense at least one of a fingerprint, an iris pattern, a handshape, hand vein patterns and movement patterns.

6. The communication device of claim 1, wherein the transponder unit is configured to being automatically disabled once a certain time interval has elapsed since the security interface unit had verified biometric data as representing verified biometric data.

7. The communication device of claim 1, wherein the communication device is a smart card.

8. A method of using the communication device of claim 1, for at least one of sending and receiving data, the method comprising:
    sensing biometric data of a user of the communication device by the biometric sensor unit;

enabling the transponder unit of the communication device for at least one of receiving and sending data upon the sensed biometric data being verified as representing verified biometric data; and verifying of biometric data by the security interface unit by:

comparing sensed biometric data with verified biometric data stored in a memory of the communication device; and issuing an enabling signal to the state machine of the communication interface of the transponder unit for enabling at least one of a sending data to and receiving data from the other communication device, wherein the enabling signal comprises a valid identification signal, and wherein a microcontroller of the transponder unit compares the valid identification signal with a plurality of verified valid identification signals and outputs the enabling signal in case of encountering a match of the valid identification signal with a verified valid identification signal, and wherein the communication interface is disabled until the communication device is unlocked by the biometric data sensed by the biometric sensor unit being verified by the security interface unit as representing verified biometric data.

9. The method of claim 8, further comprising:

disabling the state machine of the communication interface of the transponder unit once a certain time interval has elapsed since the security interface unit had verified biometric data as representing verified biometric data.

10. The method of claim 8, wherein the sensing of biometric data of a user of the communication device by the biometric sensor comprises sensing at least one of a fingerprint, an iris pattern, a handshape, hand vein patterns and movement patterns.

11. The method of claim 8, wherein the sensing of biometric data of a user of the communication device by the biometric sensor comprises sensing first biometric data and second biometric data, and wherein the transponder unit of the communication device is enabled for at least one of receiving and sending data upon the sensed first biometric data being verified as representing first verified biometric data and the sensed second biometric data being verified as representing second verified biometric data, the first and second verified biometric data being stored in at least one of the security interface unit and the microcontroller.

12. The method of claim 11, wherein at least one additional verified biometric data obtained by sensing at least one of a fingerprint, an iris pattern, a handshape, hand vein patterns and movement patterns may be added to the first and second verified biometric data upon the security interface unit verifying at least one of the sensed first biometric data as representing first verified biometric data and the sensed second biometric data as representing second verified biometric data.

* * * * *